Feb. 8, 1966   R. P. STEADMAN   3,233,686
APPARATUS FOR TILLING SOIL

Filed July 30, 1963   3 Sheets-Sheet 1

INVENTOR.
RUFUS P. STEADMAN
BY John R. Walker, III
Attorney

Feb. 8, 1966   R. P. STEADMAN   3,233,686
APPARATUS FOR TILLING SOIL
Filed July 30, 1963   3 Sheets-Sheet 2
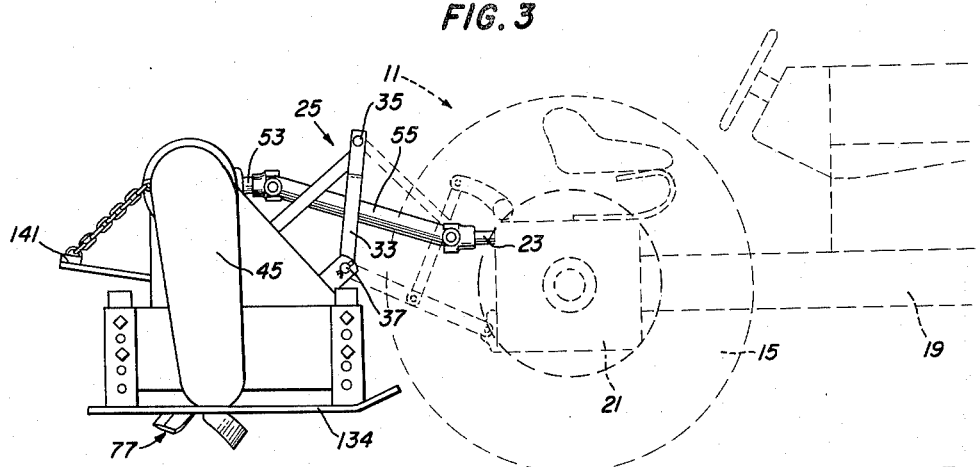
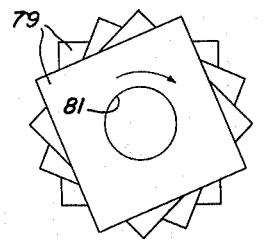
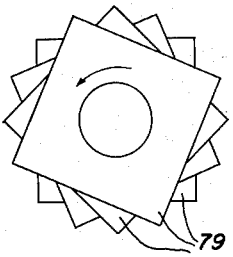
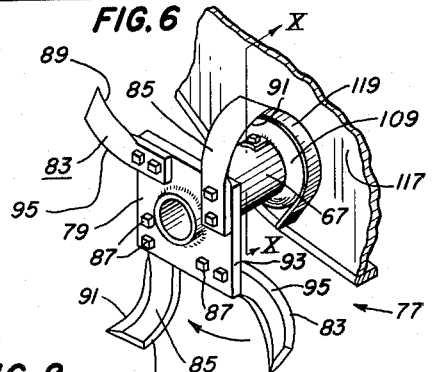
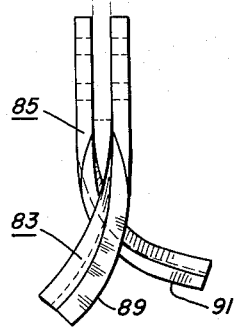
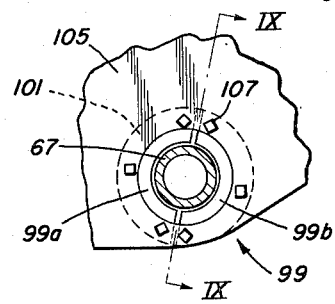
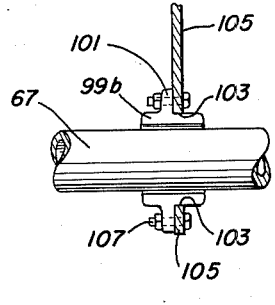
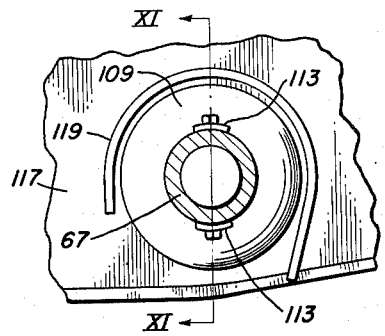
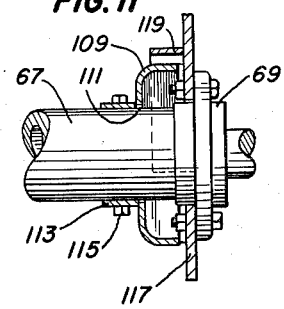
INVENTOR.
RUFUS P. STEADMAN
BY John R. Walker, III
Attorney

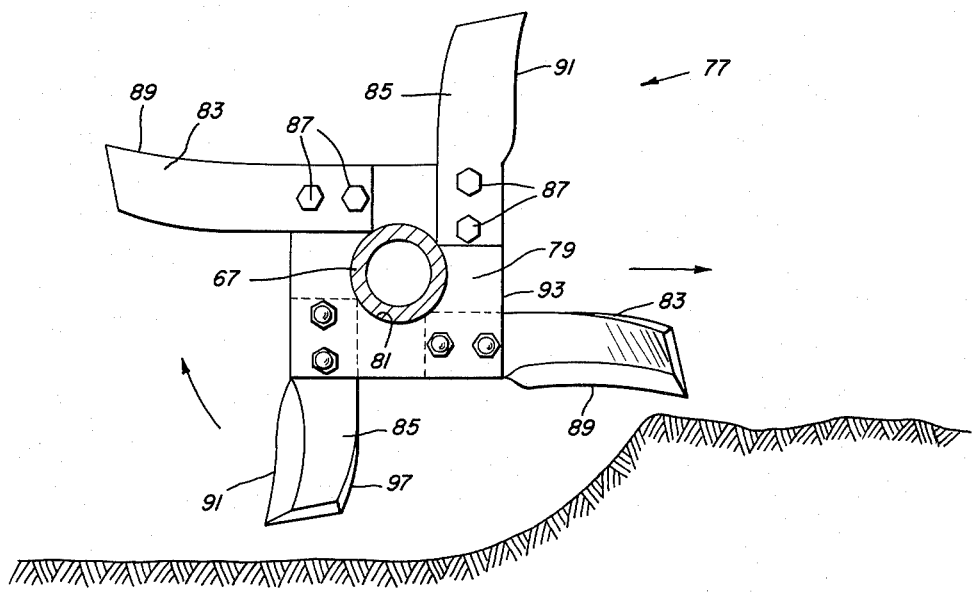
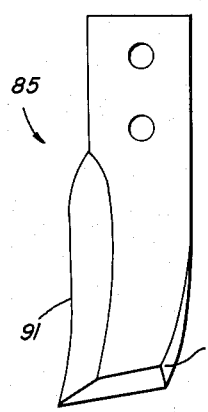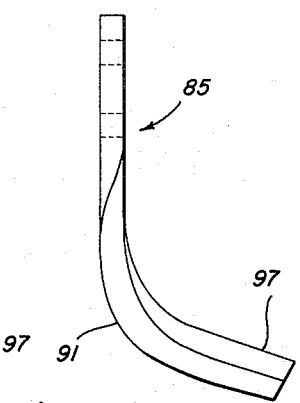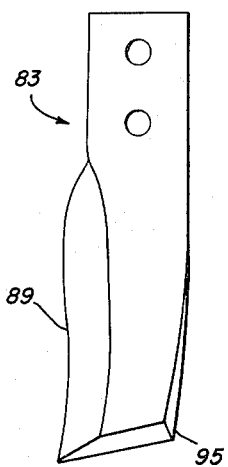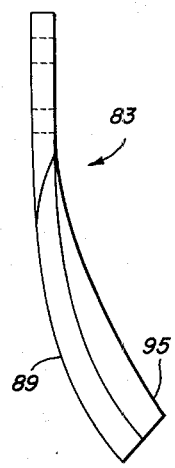
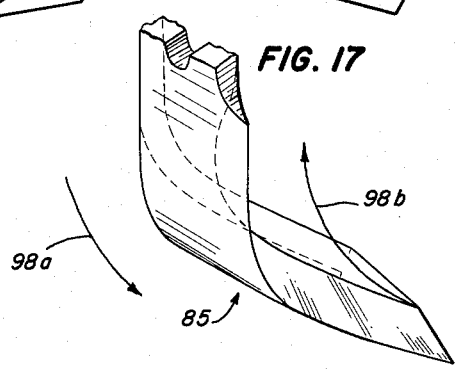

United States Patent Office 3,233,686
Patented Feb. 8, 1966

3,233,686
APPARATUS FOR TILLING SOIL
Rufus P. Steadman, Louisville, Miss., assignor to Taylor Machine Works, Louisville, Miss.
Filed July 30, 1963, Ser. No. 298,673
7 Claims. (Cl. 172—119)

This invention relates to improvements in agricultural implements and more particularly to a device for tilling the soil.

One of the important objects of the present invention is to provide an efficient and highly effective tiller.

A further object is to provide, in such a tiller, improved ground engaging units.

A further object is to provide such ground engaging units that include a unique combination of blades in each unit, namely, alternated C and L blades, whereby the C-blades go down deep into the soil and rip it up, and then the L-blades follow to pulverize the soil.

A further object is to provide such blades that are so constructed that instead of beating the ground as with previous types of blades, the present blades shear the soil and raise it to the side.

A further object is to provide such a tiller in which the ground engaging units are arranged in an opposing spiral effect so that the tendency of each of the blades to cause the tiller to move sidewise is cancelled by an equal and opposing force.

A further object is to provide, in such a tiller, means for preventing excessive deflection of the drive shaft.

A further object is to provide such means that takes the place of a central bearing and has many advantages over a bearing, such as, for example, it is more economical, there are no lubrication problems, and there are no problems of wire, etc. getting caught in it.

A further object is to provide such a tiller having improved deflector means for preventing grass, etc. from getting into the end bearings of the drive shaft.

A further object is generally to improve the design and construction of tillers.

The means by which the foregoing and other objects of the present invention are accomplished and the manner of their accomplishment will be readily understood from the following specification upon reference to the accompanying drawings, in which:

FIG. 3 is a side elevational view of a modification of the tiller.

FIG. 4 is a diagrammatic view showing the spiral arrangement of a portion of the units and taken as on the line IV—IV of FIG. 2.

FIG. 5 is a similar diagrammatic view showing the opposite spiral arrangement of the other portion of the units and taken as on the line V—V of FIG. 2.

FIG. 6 is a fragmentary perspective view of a portion of the tiller showing one of the units.

FIG. 7 is an enlarged elevational view showing the relationship of adjacent pairs of blades on a unit.

FIG. 8 is an enlarged fragmentary sectional view taken as on the line VIII—VIII of FIG. 2.

FIG. 9 is a fragmentary sectional view taken as on the line IX—IX of FIG. 8, but with the shaft being shown in elevation.

FIG. 10 is an enlarged fragmentary sectional view taken as on the line X—X of FIG. 6.

FIG. 11 is a fragmentary sectional view taken as on the line XI—XI of FIG. 10.

FIG. 12 is a cross-sectional view taken through the shaft and showing one of the units in relation to the soil.

FIG. 13 is an enlarged side elevational view of one of the L-blades, per se.

FIG. 14 is an elevational view of the blade of FIG. 13 viewed from a position 90 degrees from that of FIG. 13.

FIG. 15 is an enlarged side elevational view of one of the C-blades, per se.

FIG. 16 is an end elevational view of the blade of FIG. 15 viewed from a position 90 degrees from that of FIG. 15.

FIG. 17 is a fragmentary perspective view illustrating the action of the blade through the soil.

Figure 1:
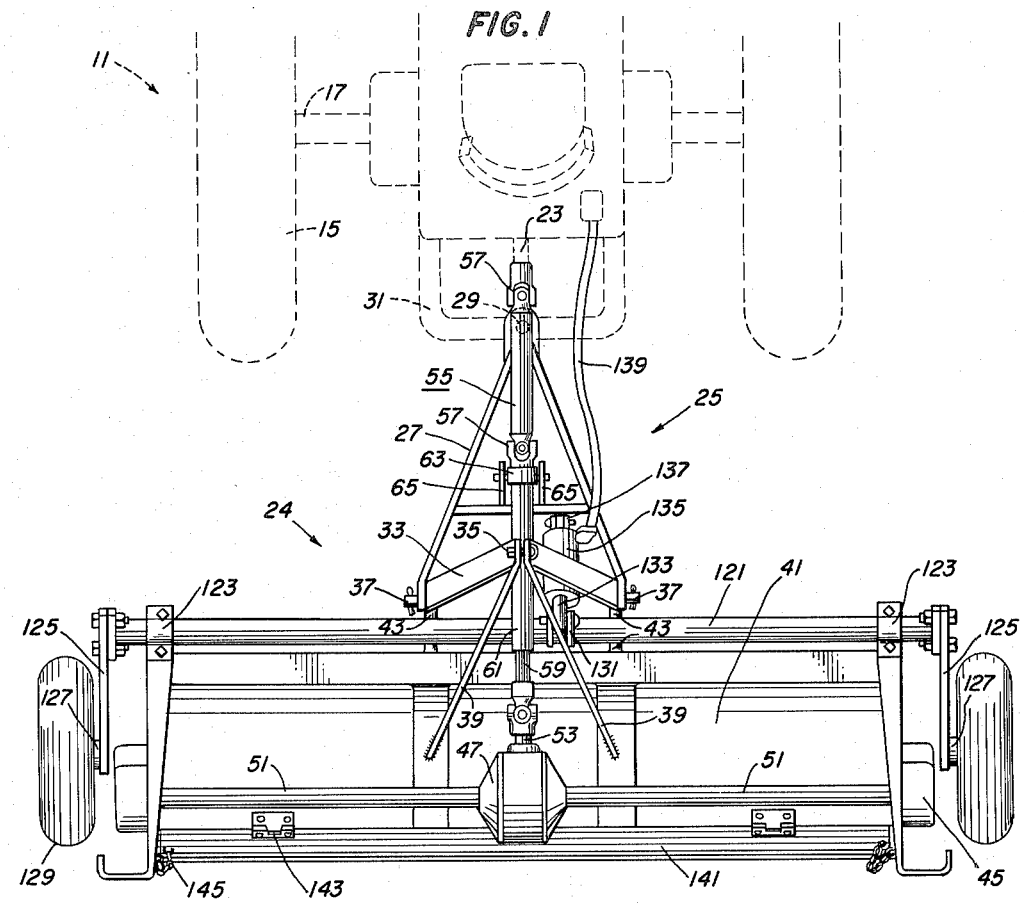
FIG. 1 is a top plan view of the tiller of the present invention shown attached to a tractor, with only a dotted line portion of the tractor being shown.

Referring now to the drawings in which the various parts are indicated by numerals, a typical tractor 11, with which the tiller of the present invention is adapted to be used, is shown partially in FIGS. 1 and 3 and includes the usual rear wheels 15 mounted on rear axles 17. In addition, the usual tractor framework 19, gear box 21, and power take-off shaft 23 are provided.

Figure 2:
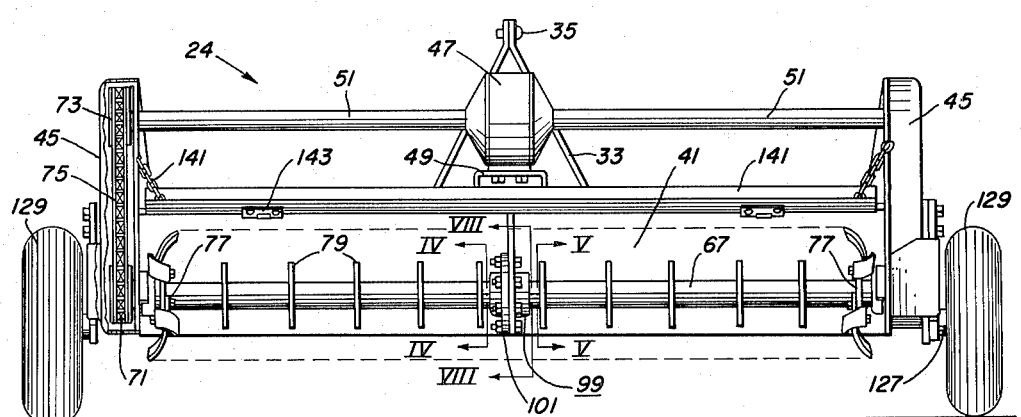
FIG. 2 is a rear elevational view of the same.

The preferable means of attaching the tiller 24 of the preferred embodiment to tractor 11 is as best seen in FIGS. 1 and 2, wherein it will be seen an attachment assembly 25 is provided, which includes an A-frame 27 that is pivotally attached to tractor 11 by suitable means as by a pivot pin 29 extending through vertically aligned openings in the A-frame and in a bracket 31 attached to the rearward portion of tractor 11. In addition, attachment assembly 25 includes an upstanding support 33 provided with pin means as at 35 adapted to be connected to the central link of a conventional three-point type of hitch. It will be understood that when used with a three-point type of hitch, the A-frame 27 should be removed, and the two laterally extending pins 37 should be used as the other two points of the three-point hitch for connection of the draft bars in the usual manner, as for example, in the manner shown in FIG. 3. Additionally, attachment assembly 25 includes braces 39 attached to the upper end of support 33 and extending rearwardly in diverging relationship therefrom where they are attached to a downwardly opening housing 41. Also attached to housing 41 are the lower ends of support 33, as by means of members 43.

From the foregoing, it will be understood that the attachment assembly 25, in general, extends forwardly from housing 41 intermediate the ends of the housing and perpendicular thereto so that when the tiller 24 is pulled by a tractor, as tractor 11, the housing 41 extends laterally and rearwardly of the tractor. Housing 41 includes upstanding housing portions 45 that are provided adjacent the opposite ends of the main body of the housing and which house drive mechanisms later to be described.

A differential gear 47 of suitable construction, such as that type commonly found in automobiles, is mounted on housing 41 adjacent the middle thereof as by a bracket 49. Differential gear 47 includes laterally extending output shafts 51 and forwardly extending shaft 53. Input shaft 53 is driven from power take-off shaft 23 by an articulated linkage 55 interconnecting the two. Linkage 55 includes universal joints 57 and includes a splined member 59 slidably and telescopically fitting into a correspondingly shaped socket in a sleeve 61. For added support of linkage 55, a bearing 63 receives sleeve 61 and is supported from A-frame 27 by members 65. The output shafts 51 of differential gear 47 respectively extend outwardly into housing portions 45 where they are mounted in suitable bearings, not shown.

A transversely extending drive shaft 67 is turnably mounted in housing 41 by bearings 69. The opposite ends of drive shaft 67 are respectively connected in housing portions 45 to output shafts 51 by the following means: Sprockets 71 are respectively fixedly attached to the opposite ends of drive shaft 67. Similarly, sprockets 73 are respectively fixedly attached to the ends of output shafts 51. In each housing portion 45, there is a continuous chain 75 coupling sprockets 71 and 73, so that when the input shaft 53 of differential gear 47 is rotationally driven from tractor 11 by the means heretofore described, output shafts 51 will rotate to cause rotational drive of shaft 67 from the opposite ends thereof. It will be understood that the above described arrangement allows the shaft and the drive mechanisms to be much smaller than they would be otherwise if the shaft were driven from one end.

Mounted on drive shaft 67 in laterally spaced relationship and partially extending below housing 41 are a plurality of soil-engaging units 77, one of which is best shown in FIGS. 6 and 12. Each soil-engaging unit 77 includes a preferably square and vertical mounting plate 79 having a central aperature 81 through which drive shaft 67 extends, with the drive shaft being fixedly attached to the mounting plate by suitable means, as welding or the like. A plurality of blades, preferably in the form of C-blades 83 and L-blades 85, are removably attached to mounting plate 79 by suitable means as bolts 87. Blades 83, 85 are mounted on plate 79 in such a manner that they are respectively adjacent the corners of the plate with the sharpened edges 89, 91 respectively of the blades 83, 85 being substantially parallel with the edge which is the leading edge at a particular corner. For example, it will be seen in FIGS. 6 and 12 that the rotation of shaft 67 is clockwise and that for the upper right-hand corner of the mounting plate 79, as viewed in these figures, the edge 93 is the leading edge and edge 91 lies in a plane that is parallel to this edge. Also, blades 83, 85 are preferably so arranged that on each plate 79 there are one pair of each type of blade or a total of four blades, and the C-blades 83 are preferably alternated with the L-blades 85. Also, one of the C-blades 83 extends generally in the opposite direction from the other C-blade, and one of the L-blades 85 extends generally in the opposite direction from the other L-blade. The C-blades 83 and L-blades 85 are all substantially the same length before forming, but the C and L blades are formed differently, with the primary difference being in the amount of bending. In FIG. 7 and in FIGS. 13–16 is shown the difference in blades 83, 85, wherein it will be seen the distal end of the L-blade 85 has been bent at an angle approximately between 45 degrees and 90 degrees relative to the vertical, and the C-blade has been bent less than 45 degrees relative to the vertical. Both blades 83, 85 have a slight twist to them, and each has a set, that is, the trailing edges 95, 97 of the blades 83, 85 are respectively bent slightly upwardly adjacent the distal ends of the blades so that only the leading edges contact the ground.

By the unique combination of blades 83, 85 hereinabove described, the soil is tilled more efficiently. Thus, the C-blades 83 go down deep into the soil and rip it up, and then the L-blades 85 follow to pulverize the soil. The blades 83, 85 rotate in the same direction that the wheels 15 of tractor 11 rotate, but at a faster rate, so that they have the effect of helping to pull the tiller 24 along.

In addition, it should be noted, the particular shape of the blades 83, 85 heretofore described in combination with the speed of the tiller 24 over the ground and the speed of rotation of shaft 67 is such that there is a maximum use of horsepower. Thus, instead of beating the ground and draining off horsepower, the blades 83, 85 shear the soil off and lay it to the side in a somewhat similar manner to a turning plow. This action is best seen in FIG. 17 wherein it will be seen the blade 85 rotates in the direction indicated by the arrow at 98a, and the soil is lifted upwardly and moved generally to the right, as viewed in this figure and as indicated by the arrow at 98b. The action of blade 83 is similar to blade 85, except that, of course, the movement of the soil is not as pronounced since the blade 83 is not bent as much as blade 85. The leading edges 89, 91 penetrate the soil and are always at a lower level than the back edges 95, 97. This can best be seen in FIG. 12 by referring to the lowermost blade 85 in this figure, where it can be seen that the leading edge 91 is lower than the trailing edge 97. In other words, the leading edge cuts the soil but the trailing edge never has to touch the uncut soil and, therefore, does not dissipate power. It should also be noted that the blades 83, 85 are self-sharpening, that is, the leading edges 89, 91 are respectively at one of the side faces of the blades, with the blades being sharpened as best seen in FIGS. 6, 7 and 12–17.

The soil-engaging units 77 on either side of tiller 24, that is, from the center out to either side, are so arranged that there is an equal and opposite effect of the blades. For example, a C-blade 83 on one side, when it hits the ground, has a C-blade on the other side which is also hitting the ground but curved in the opposite direction so that it has an equal and opposite effect. The net result is that there is no movement of the tiller 24 to one side or the other, and it has a tendency to go straight. Also, the soil-engaging units 77 are so arranged on shaft 67 that, when viewed from the center of the shaft outwardly towards the opposite ends, the soil-engaging units are disposed in opposite spiral arrangements. This is best shown in FIGS. 4 and 5 wherein only the mounting plates 79 have been shown for purposes of clarity, but it will be seen that the spiral goes in one direction in FIG. 4 and in the opposite direction in FIG. 5.

An annular sleeve 99, which has an inside diameter slightly greater than the outside diameter of drive shaft 67, is provided intermediate the ends of the shaft, with the shaft normally extending through the sleeve in spaced relationship thereto. Sleeve 99 is preferably in two halves, i.e., 99a and 99b, and is provided with an outwardly projecting flange 101. Sleeve 99 is supported in an aperture 103 provided in a vertical support plate 105 mounted on housing 41 and is removably attached to the support plate as by nut and bolt means 107. From the foregoing it will be understood that sleeve 99 prevents shaft 67 from being stressed too much. Thus, the shaft 67 only touches the sleeve 99 when the shaft becomes bent and before it gets to a point where it overstresses the shaft. In other words, the shaft 67 will press against sleeve 99 and the sleeve will act as a bearing surface but only when the shaft has been bent. This arrangement does away with the necessity of having a central bearing. Thus, such disadvantages of bearings as getting dirt and wires clogged therein, necessity of lubrication and expense thereof, are eliminated.

For each of the bearings 69 at the ends of drive shaft 67, means is provided for keeping the grass and the like out of the bearings and is as follows: A substantially annular cover 109 having a central aperture 111 is fixedly mounted on shaft 67 as by means of tabs 113 attached to the cover and through which extend screws 115 into the shaft. From aperture 111 the cover 109 extends radially outwardly and then curves inwardly substantially parallel to the axis of the shaft and over bearing 69 where it terminates in spaced relationship to the wall 117 of housing 41. An inverted substantially U-shaped guard 119 is attached to wall 117 and extends over cover 109 in closely spaced relationship thereto and downwardly on either side thereof. On the forward side of the cover 109, the guard 119 extends below the cover, whereas on the rearward side of the cover the guard terminates above the lower edge of the cover, as best seen in FIG. 10. Most of the grass is deflected away by the guard 119, but the portion of the grass that happens to get in between the guard and the cover 109 will be simply thrown downwardly to the ground.

A transverse rod 121 is rockably mounted from housing 41 for movement about a horizontal axis as by means of bearings 123. Adjacent the ends of rod 121 are fixedly mounted radially projecting arms 125. At the distal end of each arm 125 is provided an axle 127 upon which is rotatably mounted a wheel 129. Intermediate the ends of rod 121 is provided a bifurcated radially extending lever 131 to which is pivotally attached the piston rod 133 of a piston-cylinder assembly 135, which in turn has the opposite end thereof pivotally attached to A-frame 27 as at 137. Fluid is supplied from the tractor 11 through suitable lines 139 so that the extension and retraction of piston rod 133 can be controlled from the tractor. In FIGS. 1 and 2, the tiller 24 is shown in a non-engaged position of the soil-engaging units 77 with the ground, but it will be understood that for lowering the device into a ground-engaging position, wheels 129 are raised by retraction of piston rod 133. The wheels 129 may be raised just enough to be slightly below the lower edge of housing 41 so that they act as depth control wheels, or, if desired, slides, such as slides 134, shown in FIG. 3, may be used in place of or in combination therewith to control the depth.

In using the device 24 of the present invention for tilling, it will be understood that the tractor 11 simply pulls the tiller 24 over the ground to be tilled, and the rapid rotation of the soil-engaging units 77 will cause the soil to be efficiently tilled. When it is then desired to lift the soil-engaging units 77 for towing the tiller 24, the operator actuates piston-cylinder assembly 135 to extend piston rod 133 and push the wheels 129 downwardly relative to soil-engaging units 77.

To hold down the dust, etc. and to act as a guard, housing 41 preferably has the rear panel 141 thereof hingedly mounted to the main body of the housing, as by hinges 143, so that the lower edge of rear panel 141 can rest on the soil during the tilling thereof, and the panel will swing up and down to conform to the unevenness in the ground. Also, chains 145 are interposed between rear panel 141 and housing 41 to limit downward swing of the rear panel and to permit means for holding the panel in an upward position, if desired, as shown in FIG. 2.

The modification shown in FIG. 3 is the same as the principal embodiment except that slides 134 are provided in place of wheels 129 and their associated lifting mechanisms, and A-frame 27 has been eliminated so that the conventional three-point hitch of the tractor can be used. In this figure, the device is shown in a raised non-ground-engaging position, and it will be understood that to use the device it is lowered by the three-point hitch until slides 134 rest on the ground so that units 77 will be in ground-engaging positions.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. In an apparatus for tilling soil, a housing, a transverse drive shaft, a pair of bearing means supported from said housing adjacent opposite ends of said drive shaft for rotatably supporting said drive shaft from said housing, an annular sleeve having an inside diameter slightly greater than the outside diameter of said drive shaft, means on said housing supporting said sleeve intermediate the ends of said drive shaft with said drive shaft extending therethrough in spaced relationship thereto, a differential drive mechanism having an input shaft and a pair of output shafts, means attached to said input shaft and adapted for coupling to the power take-off of a tractor to drive said output shafts through said differential drive mechanism, means respectively coupling said pair of output shafts to opposite ends of said drive shaft for the rotational drive thereof, a plurality of soil-engaging units mounted on said drive shaft, each of said units including a vertical mounting plate having a central aperture through which said drive shaft extends and a plurality of blades mounted on said mounting plate and extending outwardly therefrom, said blades including an alternating pair of types with the blades of one of said types being twisted and being bent between 45 and 90 degrees relative to said plate in a direction generally towards opposite ends of said drive shaft and with the blades of the other of said types being twisted and being bent less than 45 degrees relative to said plate in a direction generally towards opposite ends of said drive shaft, said units being arranged in a spiral disposition around said drive shaft and each of said blades having a matching blade exerting an equal and opposite force when striking the ground whereby the forces cancel one another.

2. In an apparatus for tilling soil, a housing, a transverse drive shaft, a pair of bearing means supported from said housing adjacent opposite ends of said drive shaft for rotatably supporting said drive shaft from said housing, an annular cover fixedly attached to said shaft adjacent each end thereof and extending over said bearing means in closely spaced relationship to said housing, an inverted substantially U-shaped guard attached to said housing and extending over said cover in closely spaced relationship thereto, an annular sleeve having an inside diameter slightly greater than the outside diameter of said drive shaft, means on said housing supporting said sleeve intermediate the ends of said drive shaft with said drive shaft extending therethrough in spaced relationship thereto, a differential drive mechanism having an input shaft and a pair of output shafts, means attached to said input shaft and adapted for coupling to the power take-off of a tractor to drive said output shafts through said differential drive mechanism, means respectively coupling said pair of output shafts to opposite ends of said drive shaft for the rotational drive thereof, a plurality of soil-engaging units mounted on said drive shaft, each of said units including a vertical mounting plate having a central aperture through which said drive shaft extends and a plurality of blades mounted on said mounting plate and extending outwardly therefrom, said blades including an alternating pair of types with the blades of one of said types being twisted and being bent between 45 and 90 degrees relative to said plate in a direction generally towards opposite ends of said drive shaft and with the blades of the other of said types being twisted and being bent less than 45 degrees relative to said plate in a direction generally towards opposite ends of said drive shaft, said units being arranged in a spiral disposition around said drive shaft and each of said blades having a matching blade exerting an equal and opposite force when striking the ground whereby the forces cancel one another.

3. The device of claim 2 in which is included a pair of ground engaging wheels, a transverse rod, means turnably mounting said rod on said housing, a pair of arms respectively mounted on said rod adjacent opposite ends thereof and extending radially outwardly therefrom, means respectively rotatably mounting said wheels on said arms adjacent the distal ends thereof, and means operably coupled to said rod for the turning thereof to selectively raise and lower said housing relative to said wheels and the ground.

4. The device of claim 2 in which is included at least one ground-engaging slide attached to said housing for slidably supporting said housing from the ground.

5. In an apparatus for tilling soil, a housing, a transverse drive shaft, means rotatably supporting said drive shaft from said housing, means operably coupled to said drive shaft and adapted for coupling to the power take-off of a tractor to rotatably drive said drive shaft, a plurality of soil-engaging units mounted on said drive shaft, each of said units including a vertical mounting plate mounted on said drive shaft and two pairs of equi-angularly spaced blades mounted on said mounting plate, the two blades of each of said pair of blades being mounted substantially ninety degrees apart and complementary and coactingly operable; each of said pair of blades including a first blade having a tip and a second blade having a tip, rotation of said drive shaft being effective to rotate said units and to carry each of said blades and its respective tip in circular paths relative to said shaft, the circular path of the tip of said first blade having a greater radius than the circular path of the tip of said second blade, said first blade and said second blade extending generally laterally in opposite directions from said plate; each of said blades being bent outwardly and being twisted in a direction so that the leading edge of each blade adjacent to the tip thereof is lower than the trailing edge thereof when the blade is in a depending position, said first blade and said second blade having substantially the same length and respectively being substantially rectangular if straightened, said first blade being bent less than 45 degrees relative to said plate and said second blade being bent between 45 and 90 degrees relative to said plate.

6. The device of claim 5 in which said mounting plate is substantially rectangular and provided with four corners, and said blades are respectively mounted adjacent said corners with the leading edge of a said blade at a particular corner being substantially parallel with the leading edge of said plate at said particular corner.

7. In an apparatus for tilling soil, a housing, a transverse drive shaft, means rotatably supporting said drive shaft from said housing, means operably coupled to said drive shaft and adapted for coupling to the power take-off of a tractor to rotatably drive said drive shaft, a plurality of soil-engaging units mounted on said drive shaft, each of said units including a vertical mounting plate mounted on said drive shaft and two pairs of blades mounted on said mounting plate, the two blades of each of said pair of blades being complementary and co-actingly operable, each of said pair of blades including a first blade having a tip and a second blade having a tip, rotation of said drive shaft being effective to rotate said units and to carry each of said blades and its respective tip in circular paths relative to said shaft, the circular path of the tip of said first blade having a greater radius than the circular path of the tip of said second blade, said first blade and said second blade extending generally laterally in opposite directions from said plate; each of said blades being bent outwardly and being twisted in a direction so that the leading edge of each blade adjacent to the tip thereof is lower than the trailing edge thereof when the blade is in a depending position, said first blade and said second blade having substantially the same length and respectively being substantially rectangular if straightened, said first blade being bent less than 45 degrees relative to said plate and said second blade being bent between 45 and 90 degrees relative to said plate.

References Cited by the Examiner
UNITED STATES PATENTS

| | | | |
|---|---|---|---|
| 396,374 | 1/1889 | Sherman | 172—556 X |
| 2,247,685 | 7/1941 | Hipple | 308—19 |
| 2,477,662 | 8/1949 | Seaman | 172—556 X |
| 2,603,136 | 7/1952 | Thomas | 172—79 X |
| 2,652,700 | 9/1953 | Seibel. | |
| 2,657,620 | 11/1953 | Meeks | 172—123 X |
| 2,736,254 | 2/1956 | Kropp | 172—556 |
| 2,754,744 | 7/1956 | Hall | 172—556 |
| 2,903,077 | 9/1959 | Kamlukin | 172—556 |
| 2,943,687 | 7/1960 | Merry et al. | 172—123 X |

FOREIGN PATENTS

| | | |
|---|---|---|
| 821,349 | 10/1959 | Great Britain. |
| 359,917 | 3/1962 | Switzerland. |

ABRAHAM G. STONE, *Primary Examiner.*

T. GRAHAM CRAVER, *Examiner.*